(12) United States Patent
Descoteaux (10) Patent No.: US 10,688,935 B2
(45) Date of Patent: Jun. 23, 2020

(54) CARRYING SYSTEM FOR USE WITH ROLLOVER FRAME OF A TRACTOR

(71) Applicant: Timothy J Descoteaux, Morris, CT (US)

(72) Inventor: Timothy J Descoteaux, Morris, CT (US)

( * ) Notice: Subject to any disclaimer, the term of this patent is extended or adjusted under 35 U.S.C. 154(b) by 0 days.

(21) Appl. No.: 16/381,419

(22) Filed: Apr. 11, 2019

(65) Prior Publication Data

US 2019/0315284 A1   Oct. 17, 2019

Related U.S. Application Data

(60) Provisional application No. 62/655,920, filed on Apr. 11, 2018.

(51) Int. Cl.
*B60R 9/00* (2006.01)
*B60R 21/13* (2006.01)

(52) U.S. Cl.
CPC .............. *B60R 9/00* (2013.01); *B60R 21/131* (2013.01)

(58) Field of Classification Search
CPC ......... B60R 9/00; B60R 21/131; B60R 21/13; B60R 2011/0059; A01D 34/001; A45C 13/28; B62B 9/26
USPC ........ 224/410, 274–275, 407, 409, 411, 463, 224/572, 401, 426
See application file for complete search history.

(56) References Cited

U.S. PATENT DOCUMENTS

| | | | | |
|---|---|---|---|---|
| 5,370,246 A | * | 12/1994 | Traynor | A61G 5/10 132/312 |
| 7,510,157 B2 | * | 3/2009 | Oliver | A45C 13/28 220/739 |
| 2002/0056736 A1 | * | 5/2002 | Conte | A61H 3/02 224/407 |
| 2006/0186162 A1 | * | 8/2006 | Stubbs | B60P 3/079 224/572 |
| 2009/0039128 A1 | * | 2/2009 | Damico | B60R 9/00 224/572 |

* cited by examiner

*Primary Examiner* — Adam J Waggenspack
(74) *Attorney, Agent, or Firm* — Carla Gannon Law (57) ABSTRACT

A carrying system releasably engages with the rollover frame of a tractor. The system includes a header sleeve connected to the rollover frame's crossbar, at least two lateral sleeves, and at least one of those lateral sleeves engaged with each of the rollover frame's two vertical supports. The header sleeve acts as an anchor and includes straps which releasably engage the lateral sleeves. The lateral sleeves include at least one attachment site, such as a D-ring, which facilitate the releasable connection of items such as tools in a myriad of configurations. Alternative embodiments include a suspended pouch for holding smaller items; more than one lateral sleeve per side in a "daisy chain" configuration; and an anchor strap so the carrying system can be used on rollover frames that are hinged and in the folded position.

16 Claims, 15 Drawing Sheets

CARRYING SYSTEM FOR USE WITH ROLLOVER FRAME OF A TRACTOR

CROSS-REFERENCE TO RELATED APPLICATIONS

This non-provisional patent application claims the priority of U.S. provisional patent application Ser. No. 62/655,920 entitled CARRYING SYSTEM FOR USE WITH ROLLOVER FRAME OF A TRACTOR, which was filed on Apr. 11, 2018. The provisional application is hereby incorporated by reference in its entirety.

BACKGROUND OF THE INVENTION

The present invention relates to accessories for tractors, and more specifically, to a carrying system for use with the rollover frame of a tractor.

Small tractors have become indispensable in many settings such as farms, large properties and industrial facilities because they are versatile, easy to use, and relatively inexpensive. One shortcoming of small tractors, however, is that they aren't configured to carry many tools or working implements. As a result the tractor user may have a difficult time transporting items to a desired location. Solutions such as trailers are useful, but tend to be expensive, require time and energy to attach, make driving the tractor more difficult, and items in a trailer are likely to bounce around and be damaged.

As can be seen, there is a need for a system for carrying items which is easy to use, doesn't lessen the convenience or flexibility of using the tractor, doesn't unnecessarily jostle the items, and is inexpensive.

SUMMARY OF THE INVENTION

A carrying system releasably engages with the rollover frame of a tractor, thus facilitating the transport of items on the tractor. The carrying system includes a header sleeve connected to the rollover frame's crossbar, and at least two lateral sleeves suspended from the header sleeve and connected to the rollover frame's two vertical supports. The header sleeve acts as an anchor with the lateral sleeves including at least one attachment site, such as a D-ring, which facilitates the releasable connection of tools and other items in a myriad of configurations.

Alternative embodiments include a suspended pouch for holding smaller items; more than one lateral sleeve per side in a "daisy chain" configuration; and an anchor strap so the carrying system can be used on rollover frames that are hinged and in the folded position.

BRIEF DESCRIPTION OF THE DRAWINGS

FIG. 17 depicts the steps of installing the present invention on a rollover frame with:

FIG. 18 shows securing a system to a hinged rollover frame by connecting an anchor strap with:

FIG. 19 shows alternative embodiment having lower lateral sleeve with:

DETAILED DESCRIPTION OF THE INVENTION

As used herein, the following structure numbers shall refer to the various structures of the invention as depicted in the figures:

10—Carrying system;
20—Header sleeve;
22—Header strap;
30—Upper lateral sleeve;
31—Upper lateral sleeve top extension strap;
32—Upper lateral sleeve bottom extension strap;
33—Upper lateral sleeve upper cinch strap;
34—Upper lateral sleeve lower cinch strap;
35—Lower lateral sleeve;

36—Lower lateral sleeve top extension strap;
37—Lower lateral sleeve bottom extension strap;
38—Lower lateral sleeve Lower cinch strap;
39—Lower lateral sleeve lower cinch strap;
40—Hanging pouch;
42—Sleeve connecting strap;
45—Anchor strap;
50—Slider;
52—D-ring;
53—D-ring support;
56—Hook and loop strip;
57—Mating hook and loop strip;
58—Buckle;
80—Tractor;
82—Rollover frame;
84—Horizontal crossbar;
85—Vertical support;
86—Hinge;
90—Tool; and
110—Alternative carrying system.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, the present invention is a carrying system that includes a plurality of sleeves which releasably attach to the rollover frame of a tractor. The sleeves provide attachment sites such as D-rings that allow the connection of items such as tools.

Figure 1:
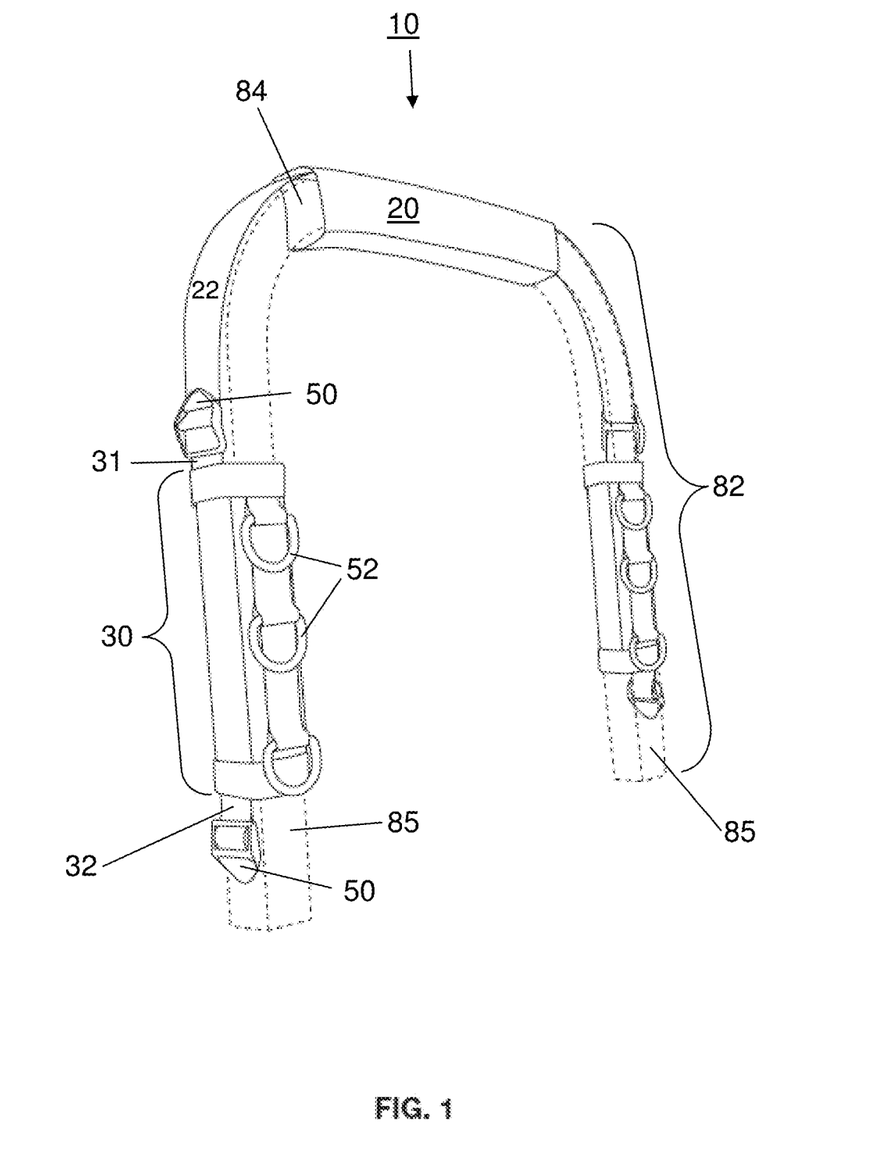
FIG. 1 is a front/side perspective view of a carrying system.
Figure 2:
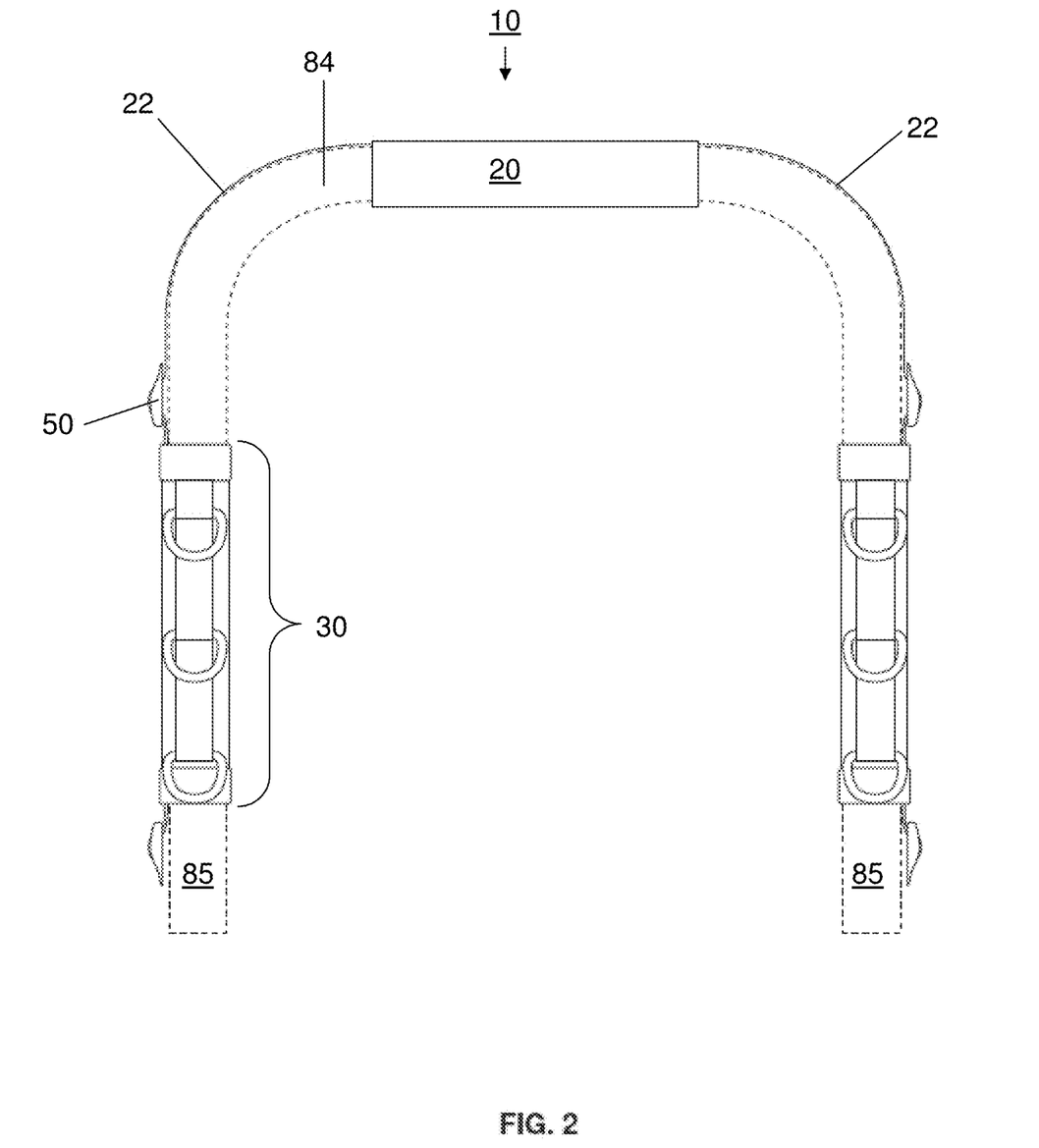
FIG. 2 is the front view of the carrying system of FIG. 1.
Figure 3:
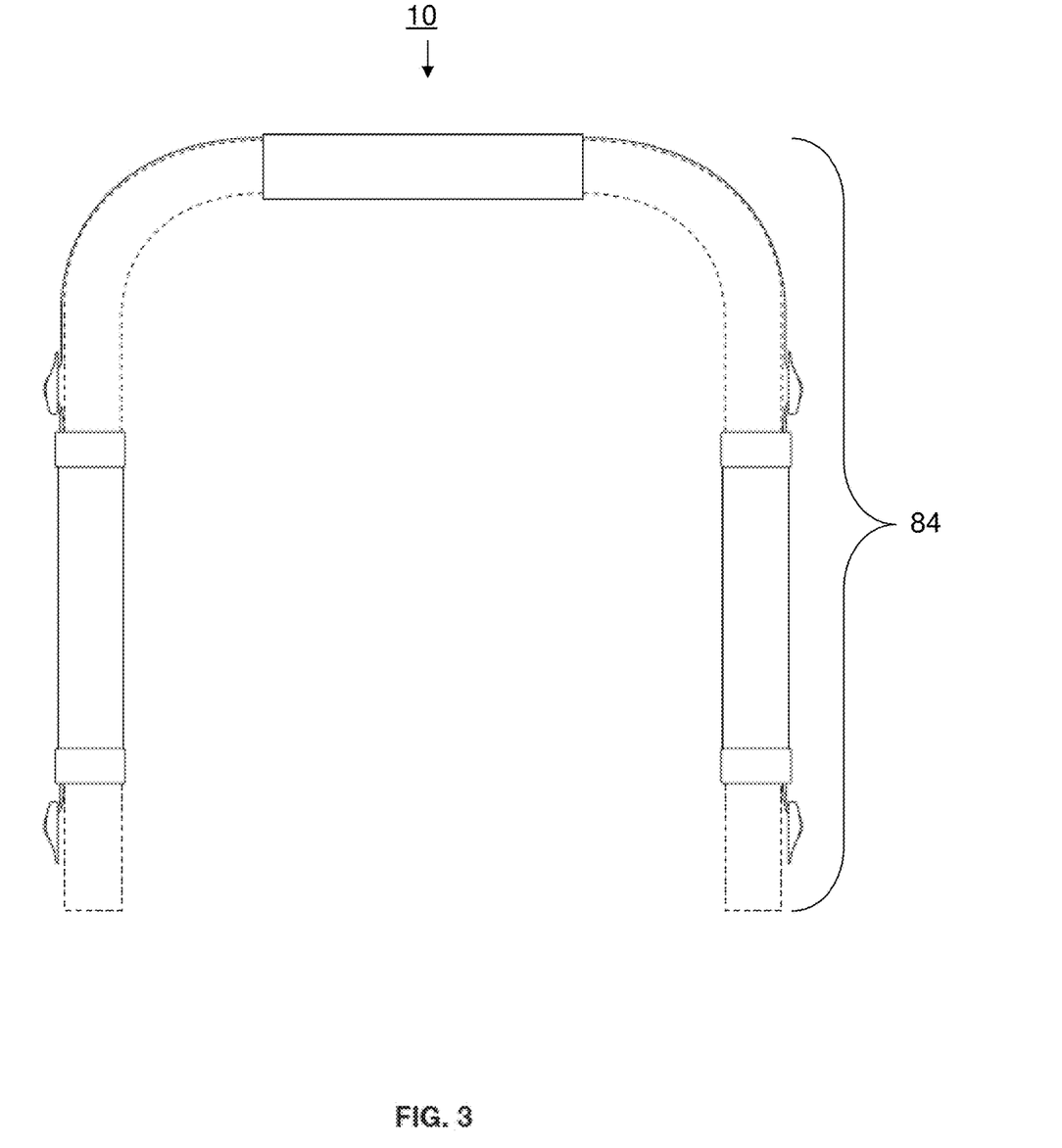
FIG. 3 is the back view of the carrying system of FIG. 1.
Figure 4:
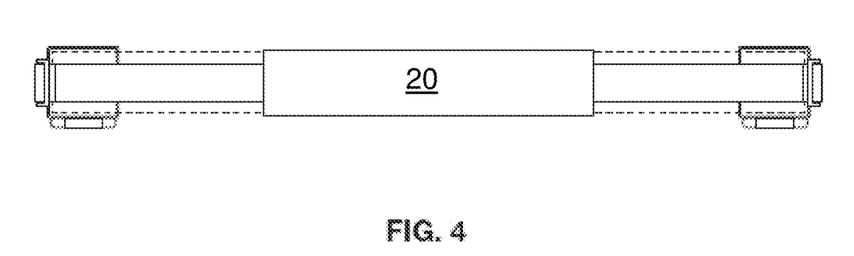
FIG. 4 is the top view of the carrying system of FIG. 1.
Figure 5:
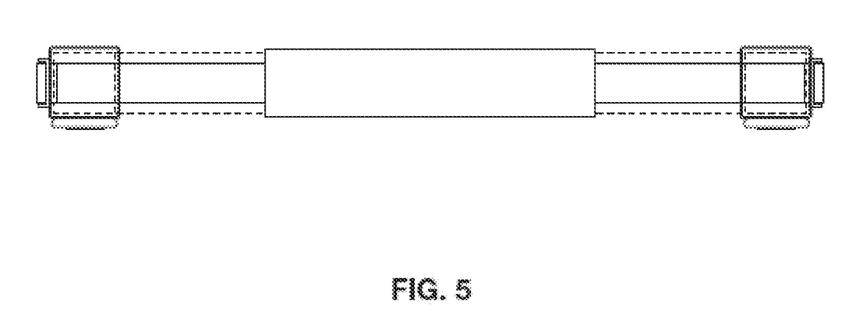
FIG. 5 is the bottom view of the carrying system of FIG. 1.
Figure 6:
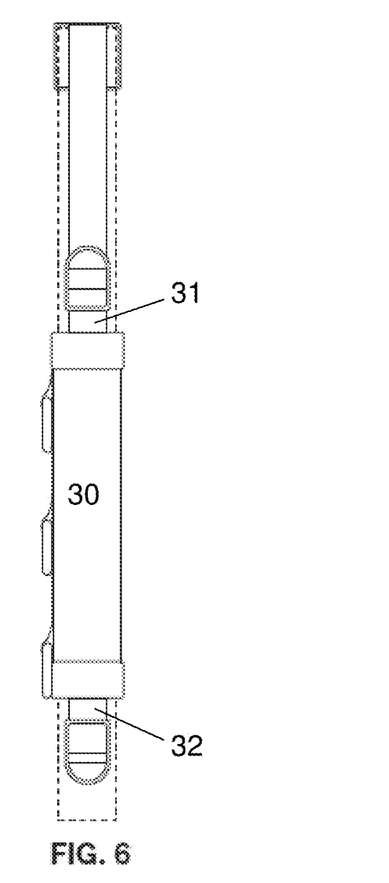
FIG. 6 is a side view of the carrying system of FIG. 1.
Figure 7:
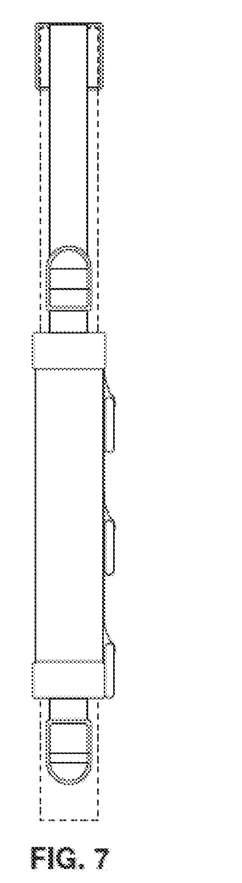
FIG. 7 is the opposite side view of the carrying system of FIG. 6.

Referring to FIG. 1, rollover frame generally includes horizontal crossbar 84 and two vertical supports 85. Carrying system 10 is secured to rollover frame 82 with header sleeve 20 positioned centrally on horizontal crossbar 84, and upper lateral sleeves 30 positioned underneath on vertical supports. Upper lateral sleeves are secured to header sleeve 20 by header straps 22. The header sleeve anchors and stabilizes the lateral sleeves by preventing them from undesirably slipping down vertical support due to weight and gravity. The distance between header sleeve and lateral sleeves can be adjusted by lengthening or shortening the segment of header strap through slider 50.

Figure 8:
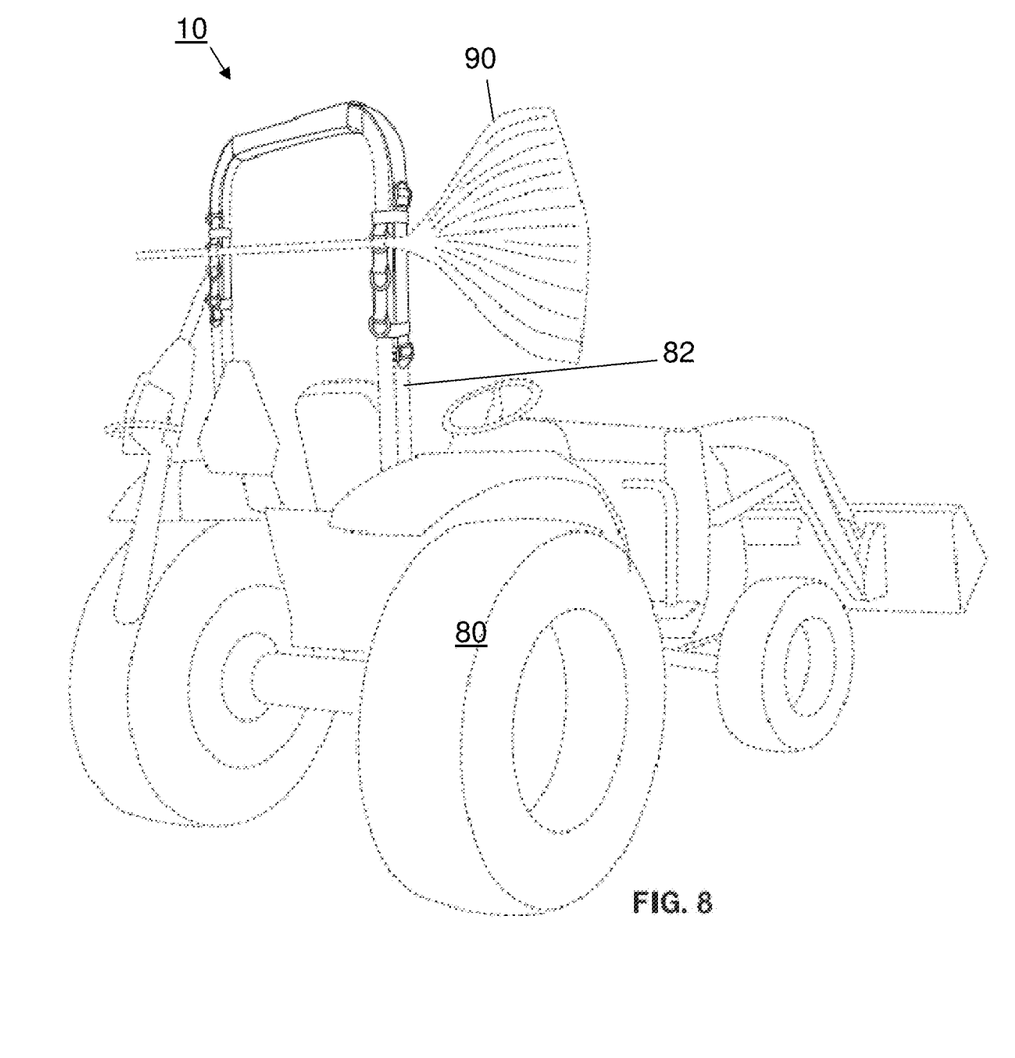
FIG. 8 is a front/side perspective view of the carrying system of FIG. 1 connected to a vehicle.

As shown in FIG. 8, an embodiment of the invention can be used on a vehicle such as a tractor, although other vehicles having rollover frames or rollover frame-like structures are also suitable. Examples of suitable vehicles include ATV's, SUV's, 4-wheelers, dune buggies, golf carts, cars and boats.

While FIG. 8 depicts carrying system 10 holding a broom as tool 90, it should be understood that "tool" as used herein refers to a variety of items including construction and landscaping items conventionally referred to as "tools", as well as supplies and goods.

Figure 9:
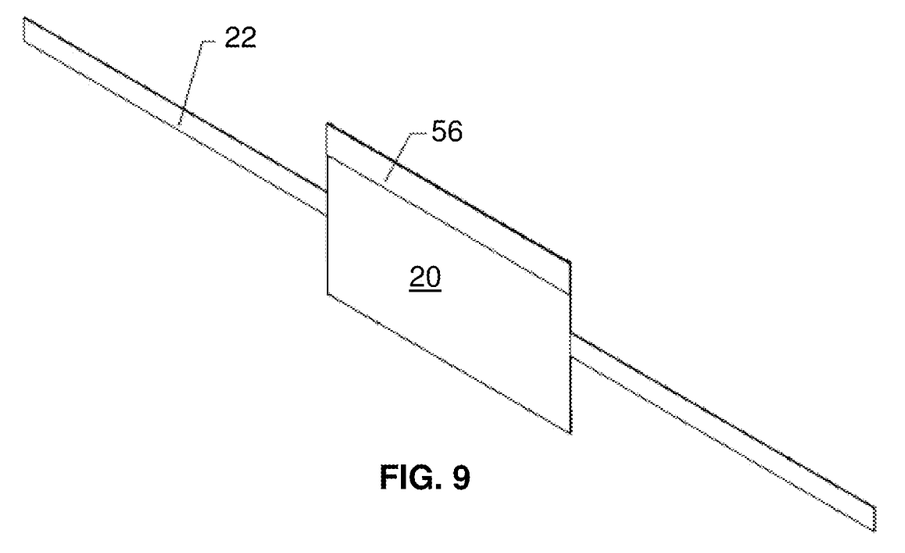
FIG. 9 depicts a perspective view of a header sleeve laid out flat.
Figure 10:
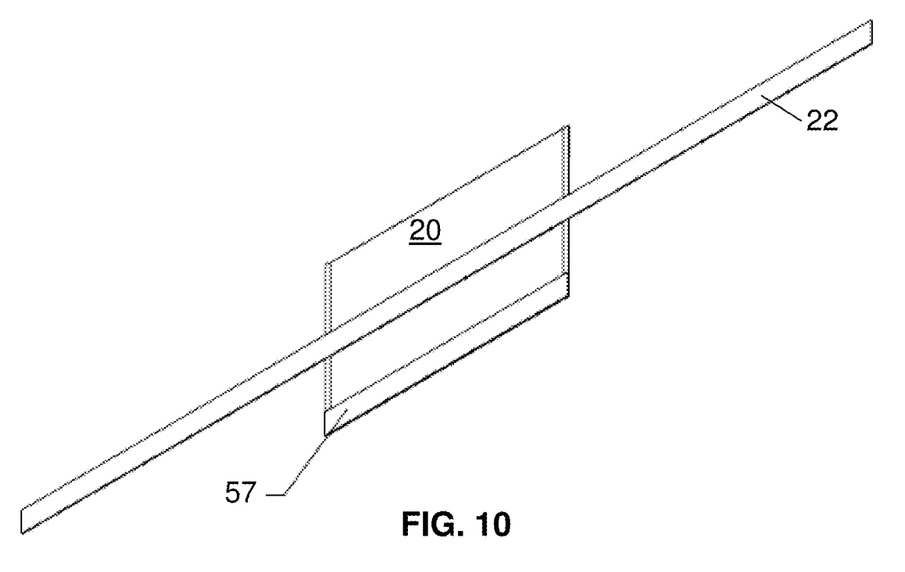
FIG. 10 depicts the opposite side of the header sleeve of FIG. 9.

Referring to FIGS. 9 and 10, header sleeve 20 includes hook and loop strip 56 on one side and mating hook and loop strip 57 on the opposite side, thereby allowing the sleeve to wrap around and secure to itself on the horizontal crossbar. Substantially permanently attached header strap 20 extends from opposing ends.

Figure 11:
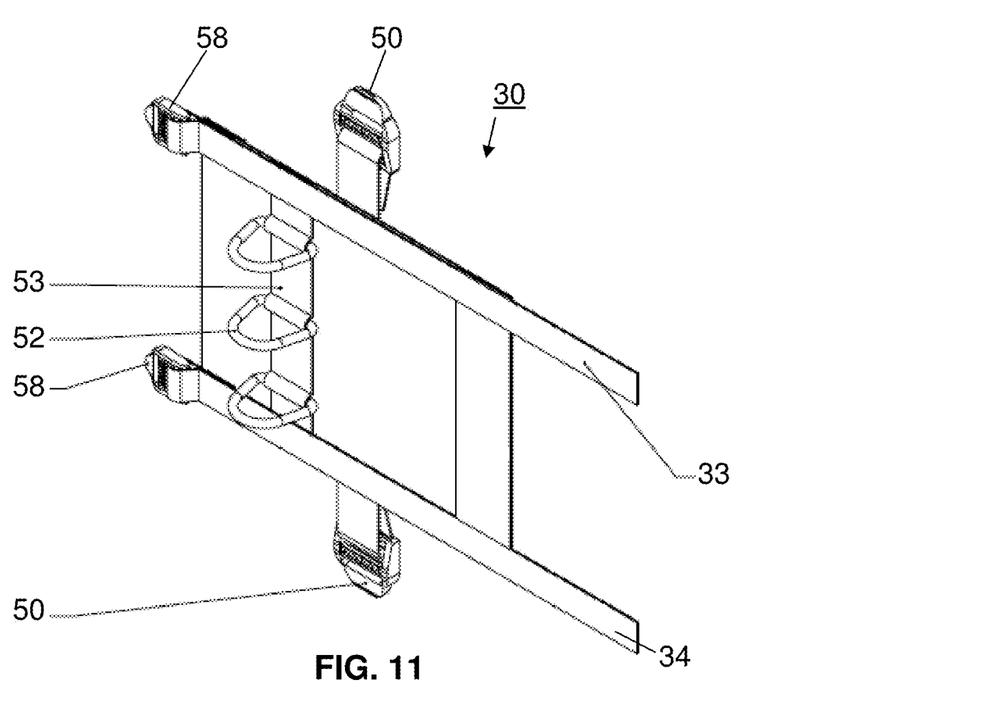
FIG. 11 depicts a perspective view of a lateral sleeve laid out flat.
Figure 12:
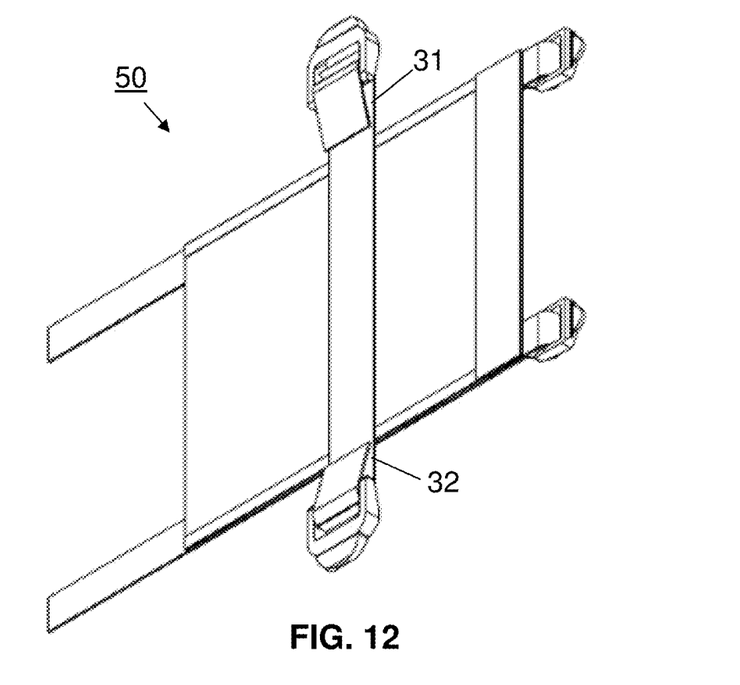
FIG. 12 depicts the opposite side of the lateral sleeve of FIG. 11.
Figure 13:
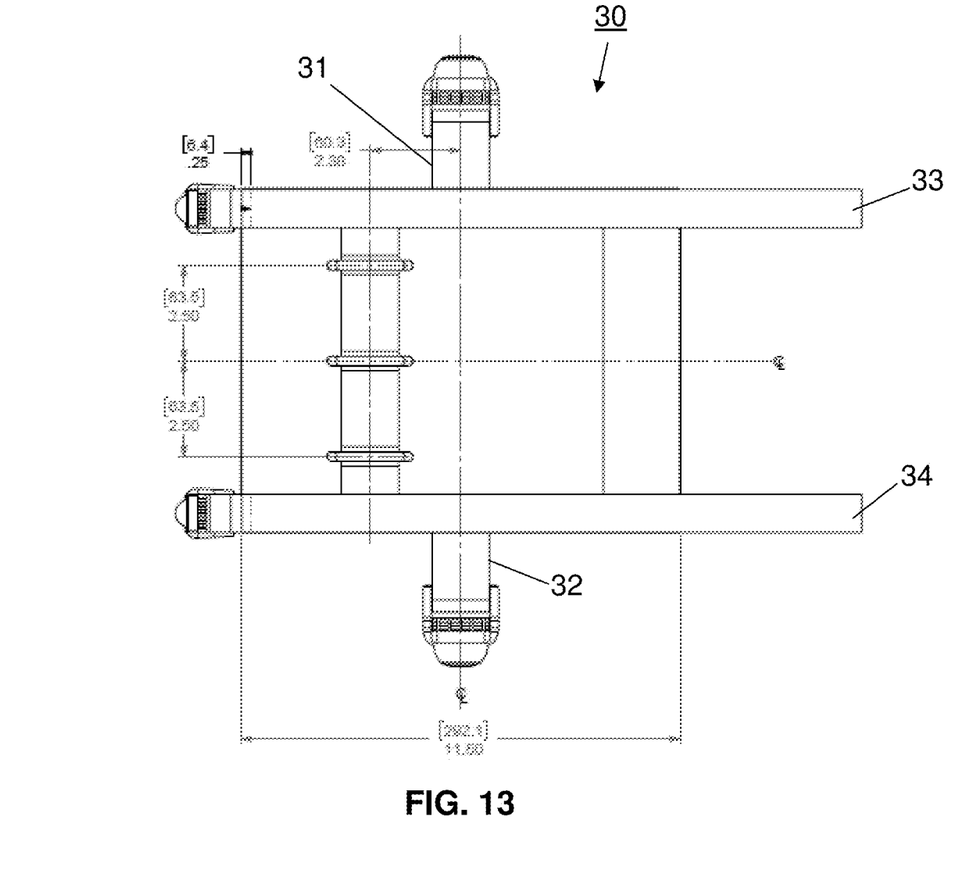
FIG. 13 depicts a lateral sleeve laid out flat.
Figure 16:
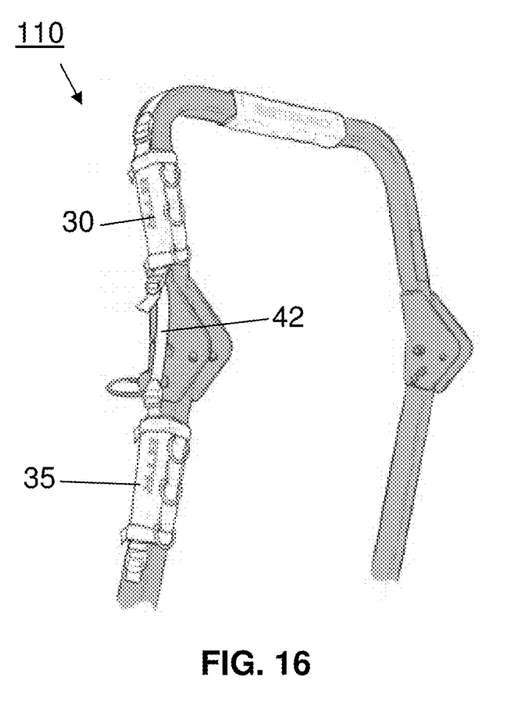
FIG. 16 depicts an alternative embodiment of the invention with a hinged rollover frame in the extended position.
Figure 17A:
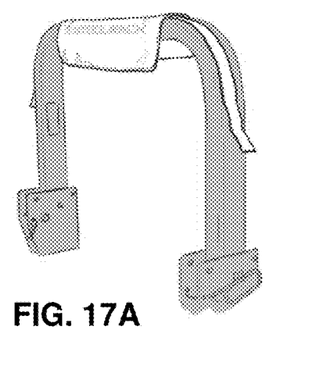
FIG. 17A showing a header sleeve laid on a horizontal bar.
Figure 17B:
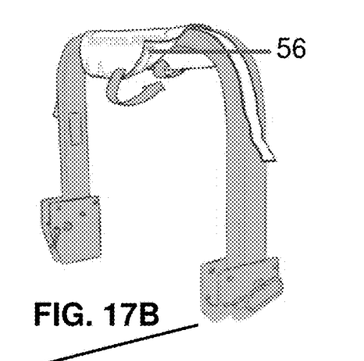
FIG. 17B showing a header being secured.
Figure 17C:
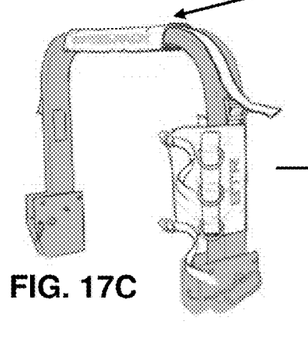
FIG. 17C showing a secured header and an upper lateral sleeve unsecured to a vertical support.
Figure 17D:
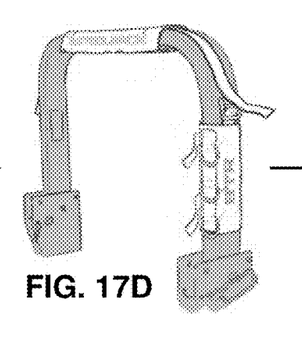
FIG. 17D showing an upper lateral sleeve secured.
Figure 17E:
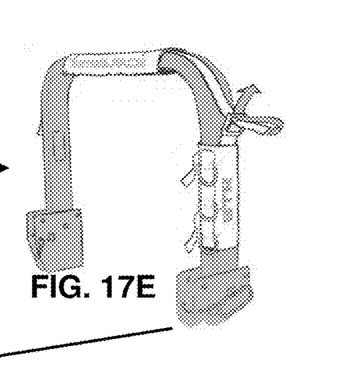
FIG. 17E showing a header strap being connected to an upper lateral sleeve extension strap.
Figure 17F:
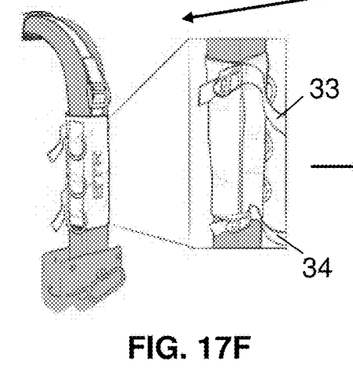
FIG. 17F showing securing an upper lateral sleeve to a vertical support with cinch straps.
Figure 17G:
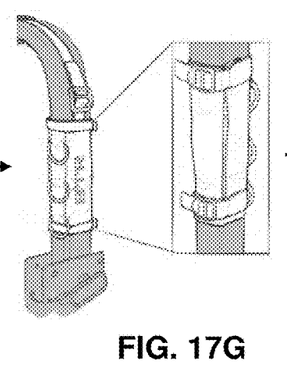
FIG. 17G depicting secured upper lateral sleeve.
Figure 17H:
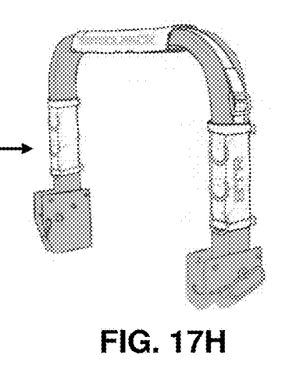
FIG. 17H showing the device with other upper lateral sleeve secured and the system ready for use.

FIGS. 11 and 12 show opposite sides of upper lateral sleeve 30, although it should be understood that lower later sleeve 35, for example shown in FIG. 16, is substantially similar. Front surface of upper lateral sleeve preferably includes at least one, and preferably a plurality, of attachment sites such as D-rings 52. Other attachment sites such as carabiners, webbing loops, hooks and the like are also within the scope of this invention. In a preferred embodiment at least one fastening device is attached to each attachment sites to releasably engage and release tools. Suitable fastening devices include carabiners, gear ties, Velcro straps, rope, belts, elastic cords, zip ties and the like. Upper lateral sleeve upper cinch strap 33 and upper lateral sleeve lower cinch strap 34 secure the sleeve to vertical support 85, as shown throughout the figures. Slider 50 on upper lateral sleeve top extension strap 31 is an attachment site for header strap 22, while slider 50 on upper lateral sleeve bottom extension strap 32 can serve as an attachment site for lower lateral sleeve 35 if present. In this manner additional lateral sleeves can be added in a "daisy chain" configuration.

Figure 14:
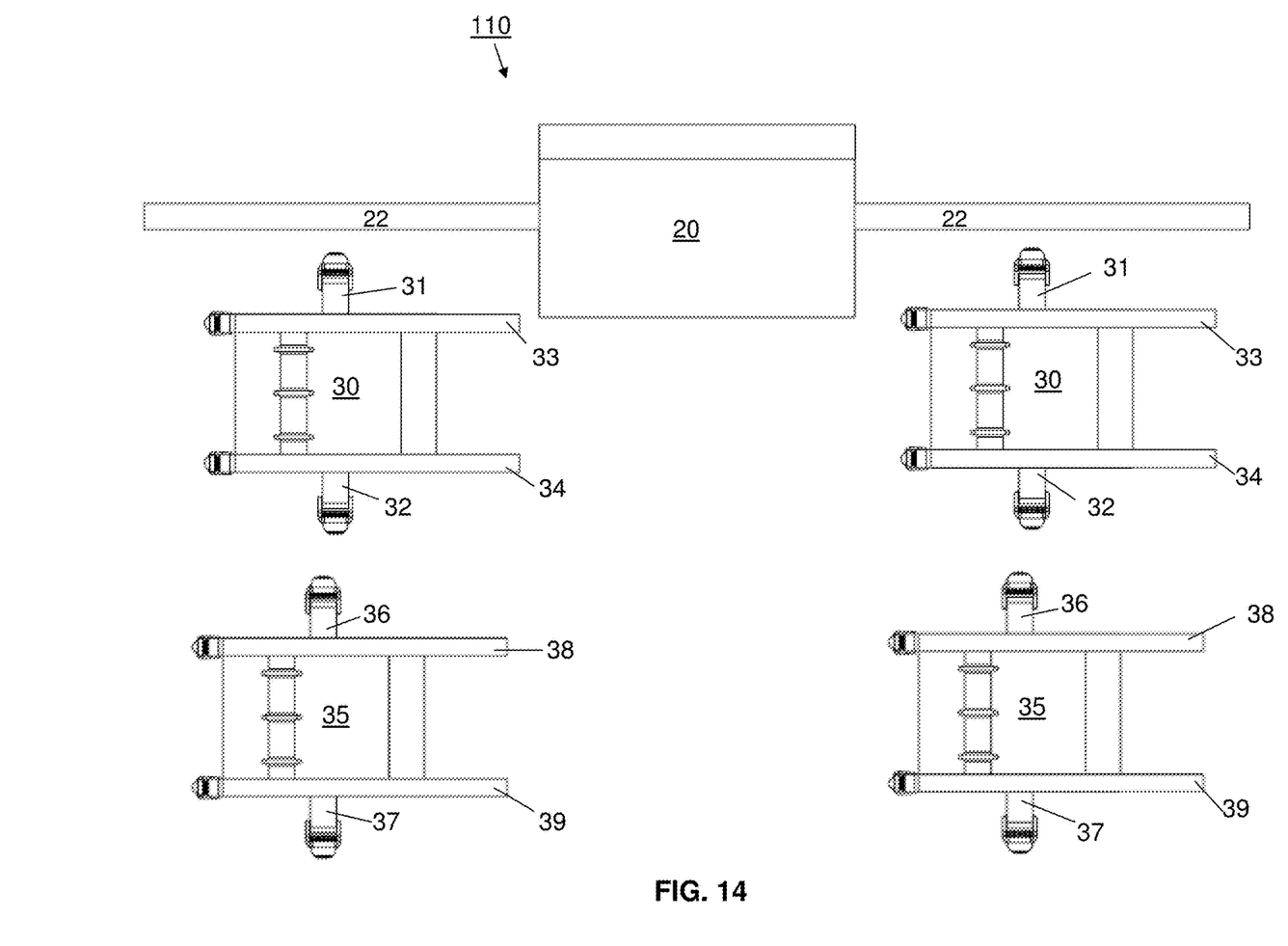
FIG. 14 schematically depicts the orientation of an alternative embodiment.

FIG. 14 schematically depicts alternative carrying system 110 which includes lower lateral sleeves 35 laid out to be daisy chained to upper lateral sleeve 30. As shown in FIG. 16, this embodiment preferably includes sleeve connecting strap 42.

Figure 15:
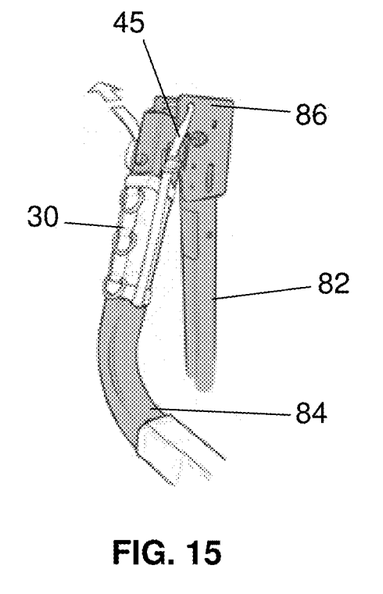
FIG. 15 depicts the invention with a hinged rollover frame in the folded position.

Referring to FIG. 15, upper lateral sleeve 30 connected to a rollover frame having hinge 86 could undesirably slide downward towards crossbar 84 when in folded position. Therefore, with hinged rollover frames it is preferable to secure upper lateral sleeve 30 to hinge 86 with anchor strap 45.

Figure 20:
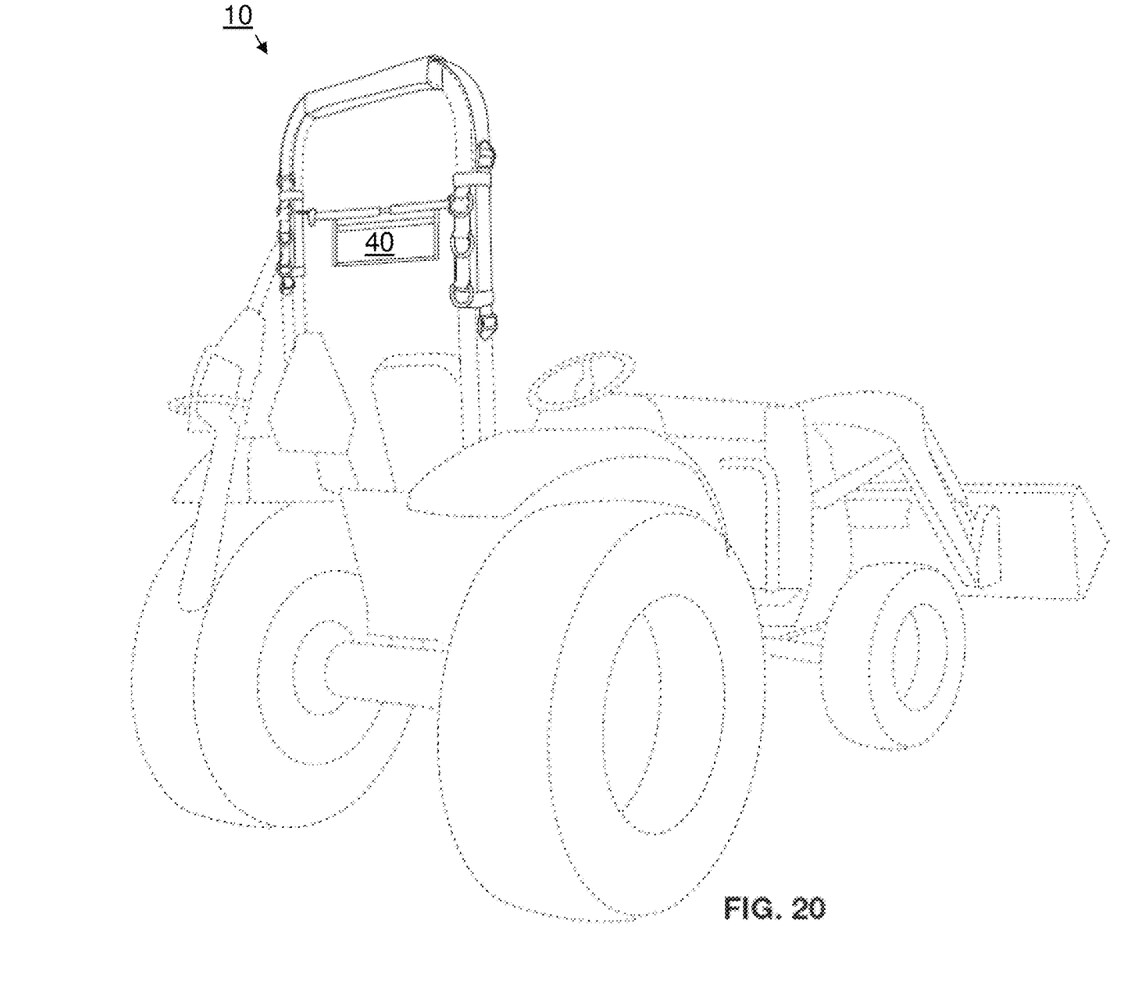
FIG. 20 depicts an embodiment including a hanging pouch.

Carrying system 10 preferably includes removable hanging pouch 40, as shown in FIG. 20.

Figure 18A:
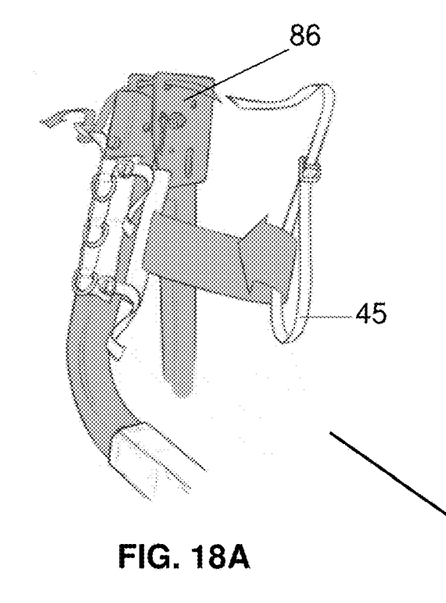
FIG. 18A depicting an anchor strap oriented for attachment.
Figure 18B:
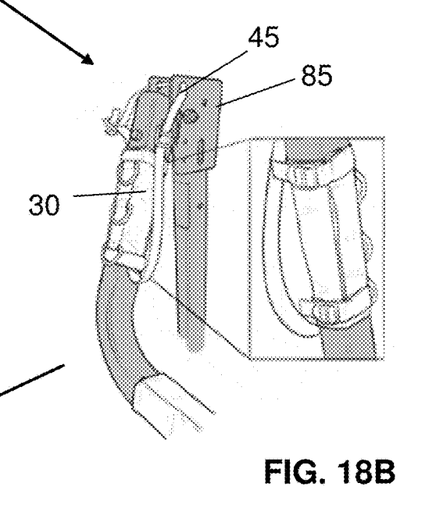
FIG. 18B depicting engagement of anchor strap with hinge and upper lateral sleeve.
Figure 18C:
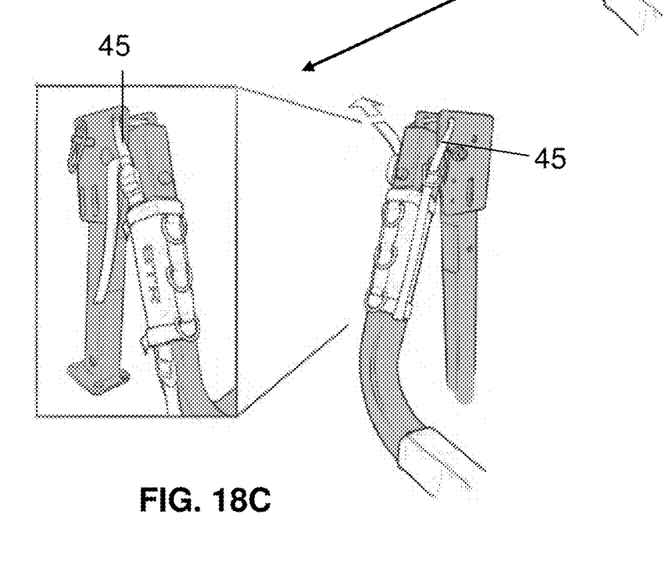
FIG. 18C depicting tightened anchor strap.
Figure 19A:
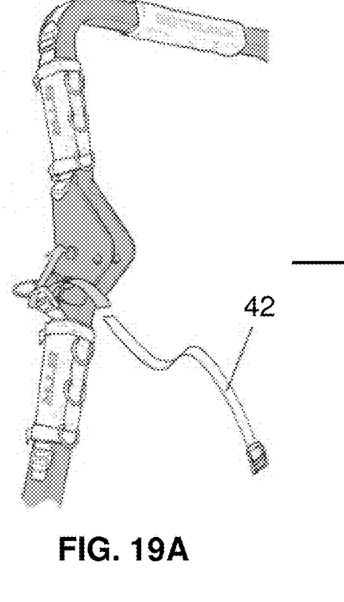
FIG. 19A showing sleeve connecting strap oriented for attachment.
Figure 19B:
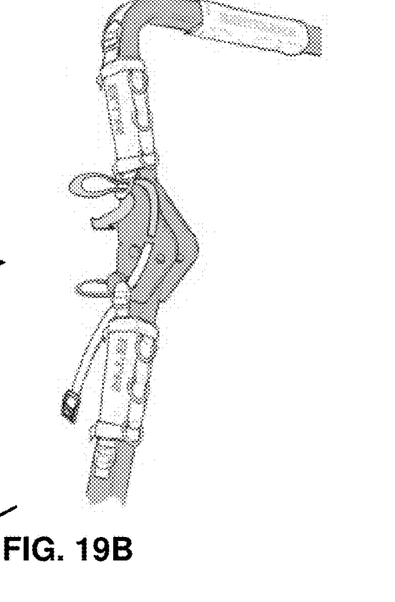
FIG. 19B depicting engagement of connecting strap with upper lateral sleeve and lower lateral sleeve.
Figure 19C:
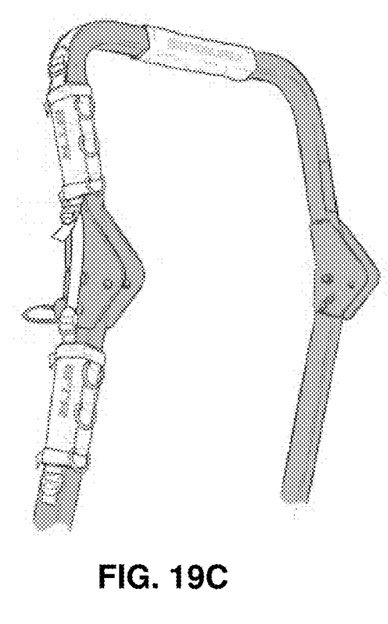
FIG. 19C depicting upper lateral sleeve connected to lower lateral sleeve on one vertical support of rollover frame.
Figure 19D:
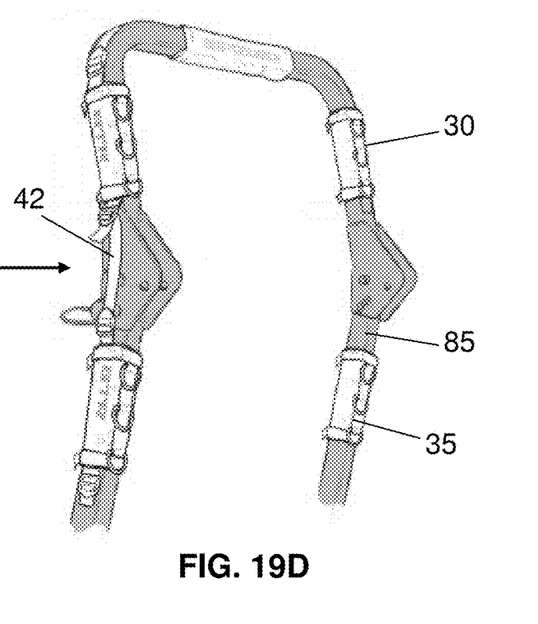
FIG. 19D depicting rollover frame with upper lateral sleeves attached to lower lateral sleeves on both vertical supports.

Generally referring to FIGS. 17, 18 and 19, in use one would secure header sleeve to horizontal crossbar by wrapping around and securing with hook and loop strips. Upper lateral sleeves are vertically stabilized by connecting to header straps of header sleeves. Lateral sleeves are then secured to vertical support by wrapping around and securing with upper and lower cinch straps. If the rollover frame is hinged, upper lateral sleeve is preferably attached to hinge with anchor strap 45. Additional lateral sleeves may be used by daisy chaining a lower lateral sleeve to an upper lateral sleeve using sleeve connection straps and securing the lower lateral sleeve with upper and lower cinch straps.

When the carrying system is properly mounted to a vehicle a user may attach tools and the like as desired, and transport those tools to another location.

Specifications of certain structures and components of the present invention have been established in the process of developing and perfecting prototypes and working models. These specifications are set forth for purposes of describing various embodiments, and setting forth the best mode, but should not be construed as teaching the only possible embodiment. Ranges of values set forth inherently include those values, as well as all increments between. Also, it should be understood that all values are "approximately", and "approximately" and the like, unless otherwise stated or contrary to common sense, are +/−10%.

What is claimed is:

1. A carrying system for a vehicle including:
   a. a central header sleeve including two header straps, said central header sleeve configured to releasably attach to the horizontal crossbar of a rollover frame; and
   b. two upper lateral sleeves each releasably attached to opposing ends of said central header sleeve with said two header straps.

2. The carrying system of claim 1 wherein said two upper lateral sleeves each include an upper lateral sleeve top extension strap, each of said upper lateral sleeve extension top extension straps releasably connected to said header straps.

3. The carrying system of claim 2 wherein each of said two upper lateral sleeve top extension straps include a slider.

4. The carrying system of claim 1 further including two lower lateral sleeves each releasably attached to said two upper lateral sleeves.

5. The carrying system of claim 4 wherein said two upper lateral sleeves each include an upper lateral sleeve bottom extension strap, each of said upper lateral sleeve extension bottom extension straps releasably connecting one of said two upper lateral sleeves to said two lower lateral sleeves.

6. The carrying system of claim 5 wherein said two upper lateral sleeves are substantially identical to said two lower lateral sleeves.

7. The carrying system of claim 6 wherein said two upper lateral sleeves include at least one D-ring.

8. A tool transporting system including:
   a. a vehicle including a substantially upwardly protruding rollover frame having a horizontal crossbar; and
   b. a carrying system releasably connected to said rollover frame, said carrying system including:
      i. a central header sleeve including two header straps, said central header sleeve configured to releasably attach to said horizontal crossbar; and
      ii. two upper lateral sleeves each releasably attached to opposing ends of said central header sleeve with said two header straps.

9. The tool transporting system of claim 8 wherein said vehicle is a tractor.

10. The tool transporting system of claim 8 wherein said two upper lateral sleeves each include a cinch strap and a buckle configured to attach said two upper lateral sleeves to said rollover frame.

11. The tool transporting system of claim 8 further including a hanging pouch suspended from said two upper lateral sleeves.

12. The tool transporting system of claim 8 further including two lower lateral sleeves each releasably attached to said two upper lateral sleeves.

13. The tool transporting system of claim 12 wherein said two upper lateral sleeves are substantially identical to said two lower lateral sleeves.

14. A method of transporting tools including the non-sequential acts of:
   a. attaching a header sleeve including two header straps to the horizontal crossbar of a rollover frame of a vehicle while vehicle is in a first location;
   b. attaching two upper lateral sleeves to said rollover frame, each attached on opposing sides of said header sleeve and releasably attaching each upper lateral sleeve to the central header sleeve using said two header straps;
   c. connecting at least one tool to one of said two upper lateral sleeves; and
   d. driving said vehicle to a second location.

15. The method of transporting tools of claim 14 further including the act of attaching two lower lateral sleeves to said rollover frame, each attached below one of said two upper lateral sleeve.

16. The method of transporting tools of claim 15 further including the act of releasably connecting said two upper lateral sleeves to said two lower lateral sleeves.

\* \* \* \* \*